United States Patent
Grahn

[11] 3,722,148
[45] Mar. 27, 1973

[54] UNIVERSAL TOOL SHARPENING FIXTURE

[75] Inventor: Arne Y. Grahn, Granby, Conn.

[73] Assignee: The Poly-Choke Company, Incorporated, East Hartford, Conn.

[22] Filed: Apr. 23, 1970

[21] Appl. No.: 31,232

Related U.S. Application Data

[63] Continuation-in-part of Ser. No. 722,952, April 22, 1968, abandoned.

[52] U.S. Cl. .................................................. 51/225
[51] Int. Cl. ................................................ B24b 3/18
[58] Field of Search ............... 279/6; 51/225, 216.6

[56] References Cited

UNITED STATES PATENTS

| | | | |
|---|---|---|---|
| 2,486,044 | 10/1949 | Lusk | 51/225 |
| 2,700,854 | 2/1955 | Detrow | 51/225 |
| 2,787,868 | 4/1957 | Schifando | 51/225 |
| 3,039,244 | 6/1962 | Vickerman | 51/219 |
| 2,672,714 | 3/1954 | Wilson | 51/225 |
| 3,447,271 | 6/1969 | Neeb | 51/225 |

Primary Examiner—Harold D. Whitehead
Attorney—Fishman & Van Kirk

[57] ABSTRACT

In the present invention of a universal tool sharpening fixture, a pair of sleeves are provided, one being rotatably mounted and the other being eccentrically positioned within the rotatably mounted sleeve so that an eccentric path of motion can be generated. A tool holder is positioned in the eccentrically mounted sleeve, and the periphery of the tool holder has a series of depressions which cooperate with a plunger to define successive positioning stations for the flutes of the tap to be sharpened. In one embodiment a positioning blade is mounted on the holder to insure a proper initial location of a tool in the holder and a two-step mechanism controls the degree of rotation of the rotatable sleeve depending on the requirements of a tool to be sharpened. In another embodiment rotational adjustment of the detent mechanism permits the radial relief at the cutting edge of the tool to be varied for either right- or left-hand tools.

17 Claims, 14 Drawing Figures

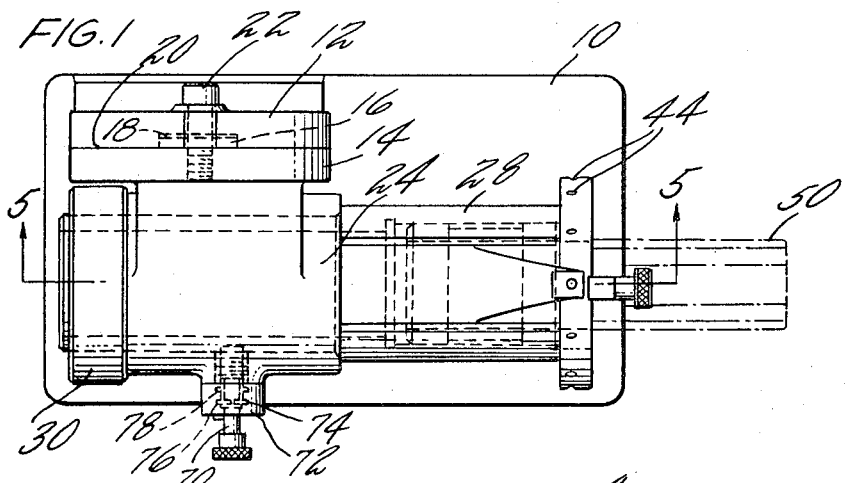
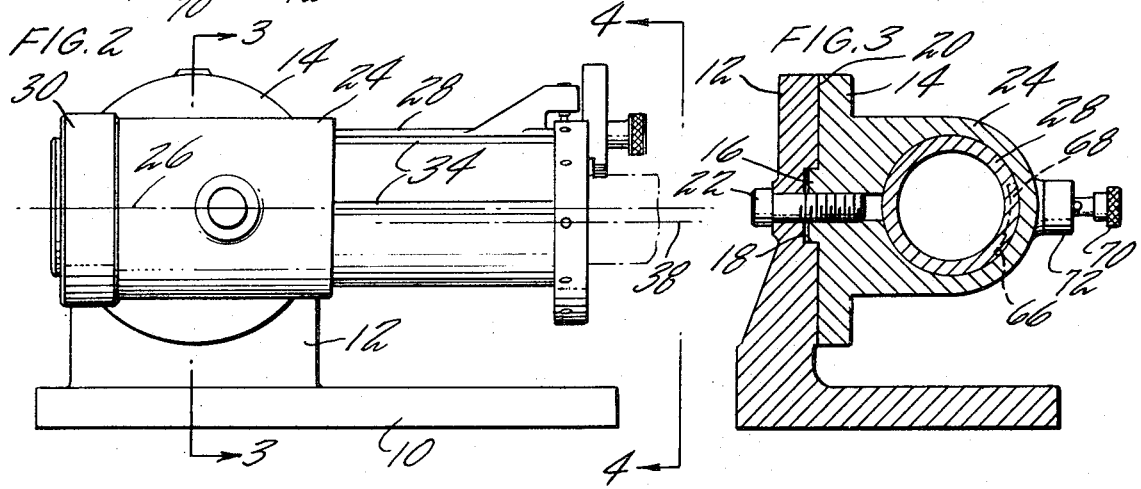
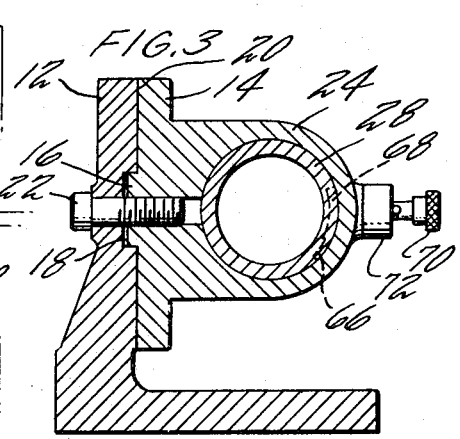
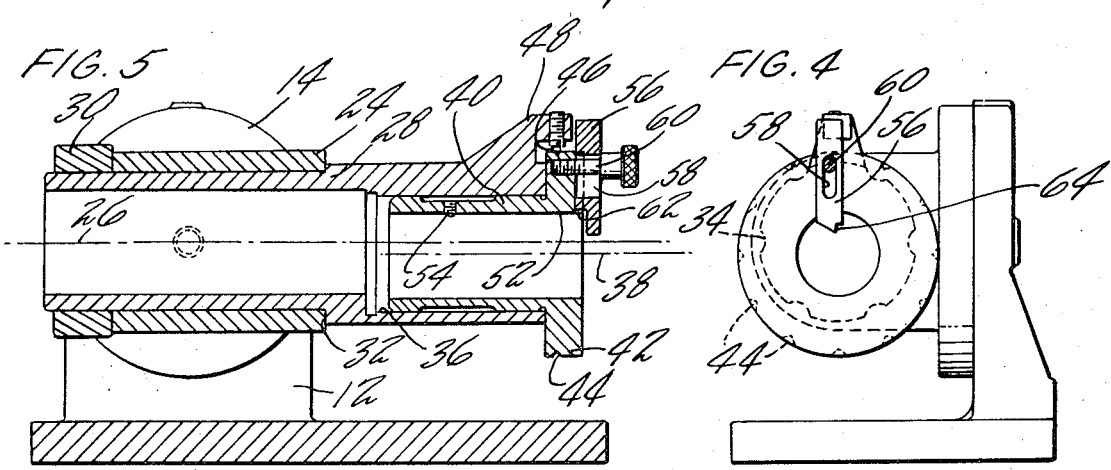
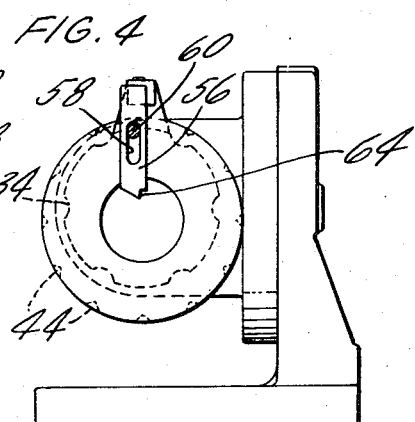
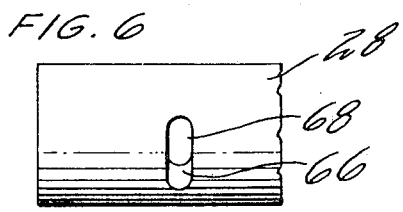

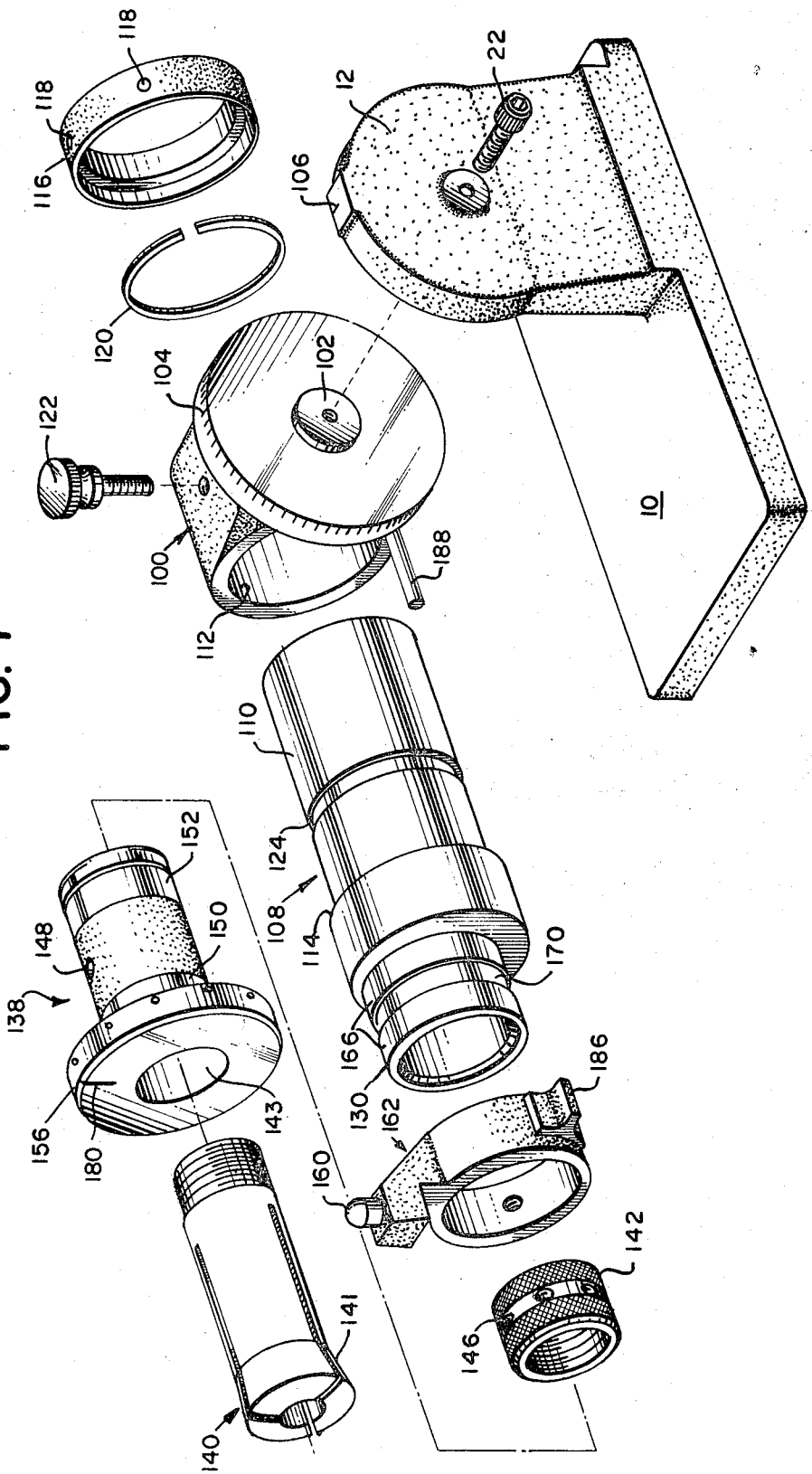

UNIVERSAL TOOL SHARPENING FIXTURE

CROSS REFERENCES TO RELATED APPLICATIONS:

This application is a continuation-in-part of the copending U. S. Patent application Ser. No. 722,952 filed Apr. 22, 1968 and now abandoned.

BACKGROUND OF THE INVENTION

1. Field of the Invention

This invention relates to tool sharpening fixtures and devices. More particularly, this invention relates to tap sharpening fixtures and devices in which the fixture imparts an eccentric path of motion to the tap to be sharpened whereby the tap travels in an eccentric path as it comes into contact with a grinding mechanism such as a grinding wheel.

2. Description of the Prior Art

The rehabilitation of worn taps by accurate and dependable resharpening has been an industrial problem of long standing. Taps are extremely expensive devices, and significant economies can be realized by tap users if tap life can be prolonged by resharpening. A number of tap sharpening fixtures have been proposed in the prior art, and the basic concept of an eccentrically mounted fixture has been included in these prior art proposals. However, these prior art devices have been impracticable for a number of reasons. Some of the prior art devices have been highly elaborate and complex thereby defeating the objectives of simplicity of operation and maintenance, and they have required long set up time. Other fixtures suggested by the prior art have lacked suitable features for accuracy and repeatability.

SUMMARY OF THE INVENTION

In the present invention a rotatable sleeve is mounted in a base fixture, and the rotatable sleeve has a hollow cylindrical end section which is eccentric with respect to the rest of the sleeve. A tap, or an arbor in which a tap is mounted, is positioned in a tap holder which is in turn mounted in the eccentric end portion so that movement of the sleeve about its main rotating axis results in eccentric movement of the tap. The tap can thus be brought into desired contact with a grinding wheel to produce the proper contact between the grinding wheel and the tap for proper sharpening of the tap. The tap holder has an extended collar in the form of a cylindrical disc, and the outer periphery of the disc is provided with a series of evenly spaced depressions. These depressions cooperate with a detent mechanism mounted on the rotatable sleeve to provide an indexing guide and a retainer for the proper successive position of flutes to be sharpened.

In one embodiment of my invention, a positioning blade mounted on the tap holder and radially adjustable with respect to the center of the tap holder serves as an aligning device to properly align the tap when it is first mounted in the tap holder. The positioning blade accomplishes its function by means of a contoured end portion which engages the top and side of a flute to properly locate the flute in the holder. Thus, the fixture of the present invention is simple to construct, operate and maintain, and it requires a minimum of set up time.

In another embodiment of my invention, an adjustable, rotatable detent mechanism on the sleeve permits the tool to be rotated slightly within the eccentric end portion to form, in essence, an adjustable cam which permits the radial relief on the cutting edge on the tool to be varied for either right-hand or left-hand tools.

Accordingly, one object of the present invention is to provide a novel and improved universal tap sharpening fixture.

Another object of the present invention is to provide a novel and improved universal tap sharpening fixture having an eccentrically mounted fixture for the sharpening operation.

Still another object of the present invention is to provide a novel and improved tap sharpening fixture having indexing and locating features for positioning the tap flutes.

Still another object of the present invention is to provide a novel and improved universal tap sharpening fixture which is simple to construct and easy to operate.

Other objects and advantages will be apparent and understood from the following detailed description and drawings.

BRIEF DESCRIPTION OF THE DRAWINGS:

In the drawings, wherein like elements are numbered alike in the several figures:

FIG. 1 is a plan view of the Universal Tap Sharpening Fixture of the present invention.

FIG. 2 is an elevation view of the Universal Tap Sharpening Fixture shown in FIG. 1.

FIG. 3 is a sectional view taken along line 3—3 of FIG. 2.

FIG. 4 is an end view taken along line 4—4 of FIG. 2.

FIG. 5 is a sectional elevation view taken along line 5—5 of FIG. 1.

FIG. 6 is a view showing details of a detent mechanism also shown in FIG. 3.

FIG. 7 is an exploded view of an alternate embodiment of my Universal Tap Sharpening Fixture which permits the amount of radial relief at the cutting edge of a tool to be adjusted.

DESCRIPTION OF THE PREFERRED EMBODIMENT

Figure 8:
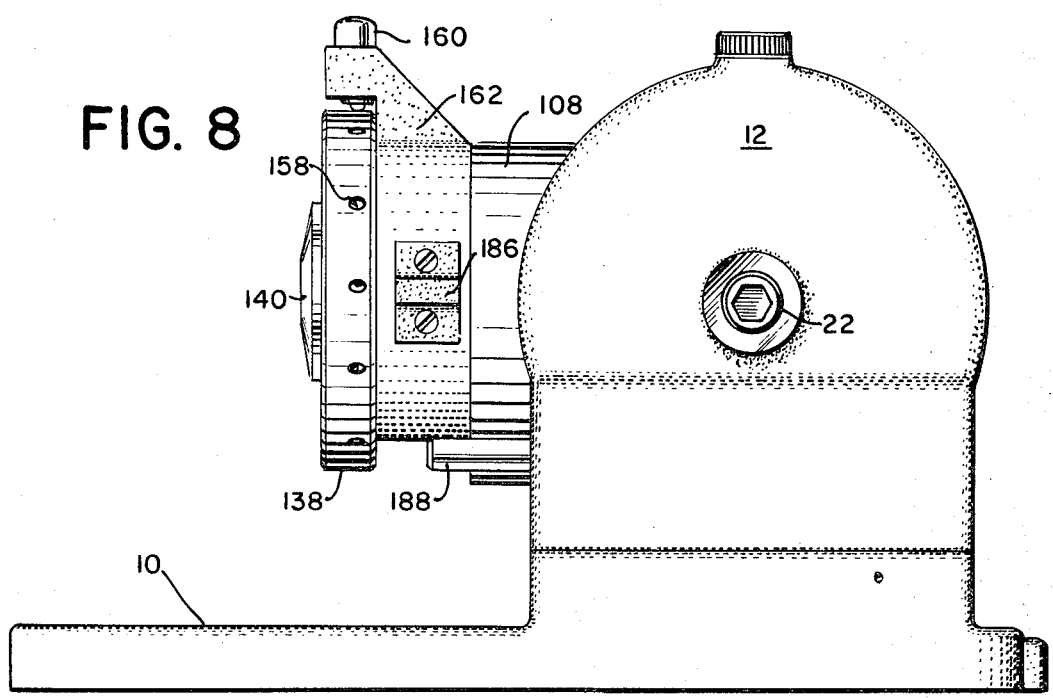
FIG. 8 is an elevation view of the alternate embodiment in assembled form.

Referring now to FIGS. 1, 2 and 5, the tap sharpening fixture of the present invention has a base 10 on which a support element 12 is mounted. Support element 12 is preferably of a circular configuration and serves as a mounting for a similar circularly shaped rotatable housing 14. Housing 14 has a projecting cylindrical bearing section 16 which mates with an appropriately shaped recess 18 in support 12, and thus housing 14 is rotatable with respect to support 12 by virtue of the bearing contact between the cylindrical elements 16 and 18 and the flat smooth mating surfaces 20 between support 12 and housing 14. A retaining bolt 22 passes through support 12 and is threaded into a recess in housing 14 to locate housing 14 with respect to support 12, and thus housing 14 is rotatable relative to support 12 while at the same time being retained by bolt 22. Housing 14 can be rotated relative to support 12 by loosening bolt 22 and then moving housing 14 to a new desired position. Support 12, housing 14, bearing projection 16, recess 18, and mating surfaces 20, and bolt 22 can also clearly be seen in the sectional elevation view of FIG. 3.

An extension or projection from housing 14 forms a sleeve housing 24 in the form of a hollow cylindrical sleeve. Housing 14 and sleeve housing 24 may be an integral one-piece cast part, and base 10 and support 12 may also be another integral one-piece cast part. The main axis of sleeve housing 24 is indicated at 26, and since housing 14 is rotatable with respect to support 12 it will be apparent that the angle of inclination of axis 26 with respect to base 10 can be varied as desired.

A rotatable sleeve 28 is mounted in sleeve housing 24. The rear portion of sleeve 28 (seen on the left in FIGS. 1, 2 and 5) projects beyond sleeve housing 24 and has a threaded portion on which a retaining nut 30 is located. Sleeve 28 also carries a shoulder portion 32 which butts against sleeve housing 24 to position sleeve 28 with respect to the housing. The distance between shoulder 32 and the forward portion of nut 30 is just slightly greater than the length of sleeve housing 24 so that nut 30 and shoulder 32 cooperate to retain sleeve 28 within housing 24 while at the same time allowing sleeve 28 to rotate within housing 24. As can best be seen in FIG. 5, the portion of sleeve 28 within sleeve 24 is cylindrical about an axis coincident with axis 26. A plurality of longitudinal grooves 34 (see also FIG. 4) are located in the outer periphery of the forward portion of sleeve 28 to facilitate manual gripping of the sleeve for rotation.

A passageway 36 extends longitudinally into sleeve 28 from the front end thereof. The walls of passageway 36 are cylindrical about axis 38 which is parallel to but displaced from axis 26. Thus, the axis 38 of passageway 36 is eccentric with respect to main rotating axis 26. A tap holder 40 is positioned in passageway 36, the axis of tap holder 40 being coincident with axis 38 and the outer dimension of tap holder 40 being compatible with the diameter of passage 36 so that holder 40 fits snugly in passageway 36 but can be manually removed therefrom. A collar 42 at the front end of tap holder 40 serves as a stop to position the tap holder in passageway 36. Collar 42 also has a series of evenly spaced depressions 44 around the periphery thereof, and a spring loaded ball detent 46 engages one of the depressions so as to secure the tap holder against both axial and rotary motion with respect to passageway 36. Detent 46 is mounted on a finger 48 which extends from sleeve 28 and projects beyond the front of sleeve 28.

In the operation of the universal tap sharpening fixture of the present invention, a tap 50 (see FIG. 1) to be sharpened will be placed in the interior central opening 52 of tap holder 40, either directly or by means of an intermediate bushing depending on the size of tap 50. The flutes of the tap would, of course, extend beyond the fixture as shown in FIG. 1. The tap would be positioned within tap holder 40 while tap holder 40 is removed from passageway 36, and a set screw 54 in holder 40 would be screwed inwardly to lock the tap in holder 40. Holder 40 would then be inserted in passageway 36 and one of the depressions 44 would be engaged by spring loaded ball detent 46 to retain the holder. The entire fixture is positioned in close proximity to a grinding wheel to be used therewith, and the angular position of sleeve 28 with respect to base 10 is selected in accordance with the needs of the particular grinding operation to be performed (e.g. a bottom, starting or plug tap grinding operation, or any intermediate shape). Of course, as will be apparent, the positioning of housing 24 by loosening and retightening bolt 22 can be accomplished either before or after the tap holder is inserted in passageway 36, the approximate general position being such that the grinding wheel or other grinding tool is positioned just slightly above the front portion of tap 50. The base 10 may, if desired, be secured to a table by magnetic means or any other hold down means.

The operator performing the resharpening task then sets the grinding wheel in motion and manually grasps and rotates sleeve 28. The axis of tap 50 is coincident with axis 38 of passageway 36, and it is thus eccentric with respect to main rotating axis 26. Because of this eccentric mounting of the tap, rotation of sleeve 28 results in the front end of tap 50 being raised upwardly into contact with the grinding tool whereby a flute of the tap is ground and sharpened with an appropriate trailing radial relief or rake. After the grinding operation for one flute has been completed, sleeve 28 is again manually rotated to its original position to withdraw the tap from contact with the grinding wheel. Tap holder 42 is then rotated about its axis an appropriate number of degrees to bring another flute into position for the grinding operation, and the position of the tap holder will be secured by engagement between detent 46 and another depression 44. The manual rotation of sleeve 28 is then repeated to produce the eccentric motion whereby the newly positioned flute is brought into grinding contact with the grinding wheel. The appropriate amount of rotation imparted to tap holder 40 will, of course, depend on the number of flutes in the tap, and complete duplication and repeatability of the grinding operation for each flute can be assured by alignment of the flutes with respect to the depressions 44 and then by merely making sure that the grinding operation for each flute is carried on only when ball detent 48 engages the correspondingly positioned depression 44 associated with each of the flutes. In this manner, indexing of the tap between successive grinding positions is significantly simplified since proper indexing is assured merely by reference to corresponding depressions 44 aligned with each of the flutes. Of course, it will also be apparent that the degree of rotation necessary to properly index tap holder 40 from one position to the next will depend on the number of flutes in the tap being sharpened.

The immediately foregoing discussion has been directed to a description of the feature whereby duplication and repeatability of the grinding operation is assured for each flute by properly aligning each flute during the grinding operation. The structure shown in FIG. 4 adds the further feature of assuring the proper initial location of the tap with respect to tap holder 40 when the tap is being mounted in the tap holder. A reference positioning blade 56 having an elongated opening 58 is mounted on the front of tap holder 40 by a screw 60. The inner edge of the blade rides in a radial groove 62 in the front face of tap holder 40 so that blade 56 can be moved radially in and out with respect to the center of the tap holder but the blade is constrained against any angular or other displacement. The innermost end of reference blade 56 has a stepped portion 64 which serves to align the tap when the tap is first mounted in holder 40. When a tap is inserted in holder 40, it is brought into contact with step 64 so that the cutting face of one flute is in contact with the vertical portion of the step while the horizontal part of the step overlies the top of the flute. Thus, the initial position of a tap in the tap holder is always accurately determined by reference blade 56 so that both constancy of initial position and accuracy of indexing are assured. Once a tap has been initially set in the holder by reference to blade 56, it should not be moved relative to blade 56 until all flutes have been ground.

Referring now to FIGS. 1, 3 and 6, structure is shown for controlling the degree of rotation or throw imparted to sleeve 28 during the sharpening operation. It may be desired to limit the degree of rotation of sleeve 28 within two broad ranges depending on the width of the land of the tap or the number of flutes in the tap so as to assure that each flute will be fully ground and that only one flute will be brought into contact with the grinding wheel during a single rotation of sleeve 28. To that end, sleeve 28 is provided with a two-step depression consisting of a shallower depression 66 and a deeper depression 68. A plunger 70 extends into housing 24 through a box 72 projecting from housing 24. A single turn of spring wire 74 is mounted on a peripheral groove in plunger 70, and wire 74 is adapted for engagement with either an outer groove 76 or an inner groove 78 in the inner wall of box 72. As can best be seen in FIG. 3, deeper depression 68 is actually a continuation of the arc of depression 66 set deeper into sleeve 28. This throw control structure could also be repeated at another position to allow and control rotation in the opposite direction.

Plunger 70 is manually operable between the two stations defined by grooves 76 and 78. When plunger 70 is positioned so that spring 74 is engaged in groove 78, the inner end of plunger 70 projects its maximum distance into sleeve 28, and the inner end of plunger 70 then cooperates with deeper depression 68 to limit the rotation of sleeve 28 to an amount equal to the arc of depression 68. When plunger 70 is retracted so that spring 74 engages groove 76, the inner end of plunger 70 then extends into sleeve 28 to a lesser extent, and sleeve 28 can be rotated through an arc equal to the combined arc of depression 66 and depression 68 before engaging with travel limiting walls of the depressions. Thus, when the tap to be sharpened has a large outer surface and a small number of flutes or other factors requiring a long sharpening stroke, plunger 70 would be retracted to the position wherein spring 74 engages groove 76, and a wide arc of rotation would be allowed for sleeve 28. Conversely, when the requirements of the tap make a smaller sharpening stroke desirable, plunger 70 would be moved inwardly to the station where spring 74 engages groove 78, and the permissable arc of rotation of sleeve 28 would then be cut down.

FIGS. 7–13 disclose an alternate embodiment of my Universal Sharpening Fixture. The alternate embodiment employs the same principal of rotating an eccentrically mounted tool holding assembly as in the previous embodiment and additionally provides an adjustable detent mechanism to vary the radial relief ground on the tool at the cutting edge.

Reference to FIG. 7 shows the alternate fixture in an exploded view. The base 10 is similar to that shown in the embodiment of FIGS. 1–6. A sleeve housing 100 is rotatably mounted to support element 12 by means of bolt 22 and includes a cylindrical boss or bearing section 102 which mates with the cylindrical recess 18 (FIGS. 1 and 11) in the support 12. The flat confronting surfaces between the housing 100 and support 12 maintain the alignment of housing 100 with the base 10 as it is rotated about a tilting axis defined by the cylindrical section 102 and recess 18. A graduated scale 104 is scribed on the housing 100 and cooperates with an index mark 106 on the support 12 to accurately measure or position the inclination of housing 100 with respect to the base 10. The bolt 22 can be tightened to secure the housing at the desired angular position.

A rotatable sleeve 108 includes a rear cylindrical portion 110 which is received in close fitting contact within a cylindrical bore 112 of housing 100. The fit between portion 110 and the bore 112 permits the sleeve 108 to be rotated manually within the housing 100 and maintains the portion 110 concentrically positioned about the bore axis.

Figure 9:
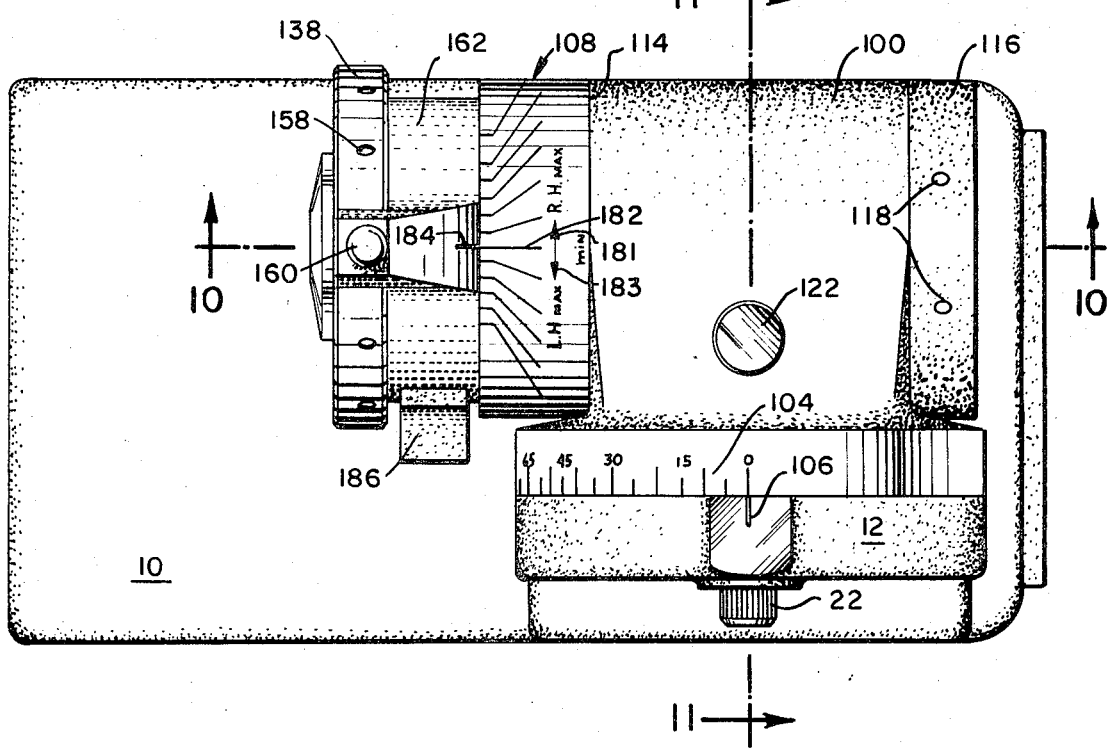
FIG. 9 is a plan view of the alternate embodiment in assembled form.
Figure 10:
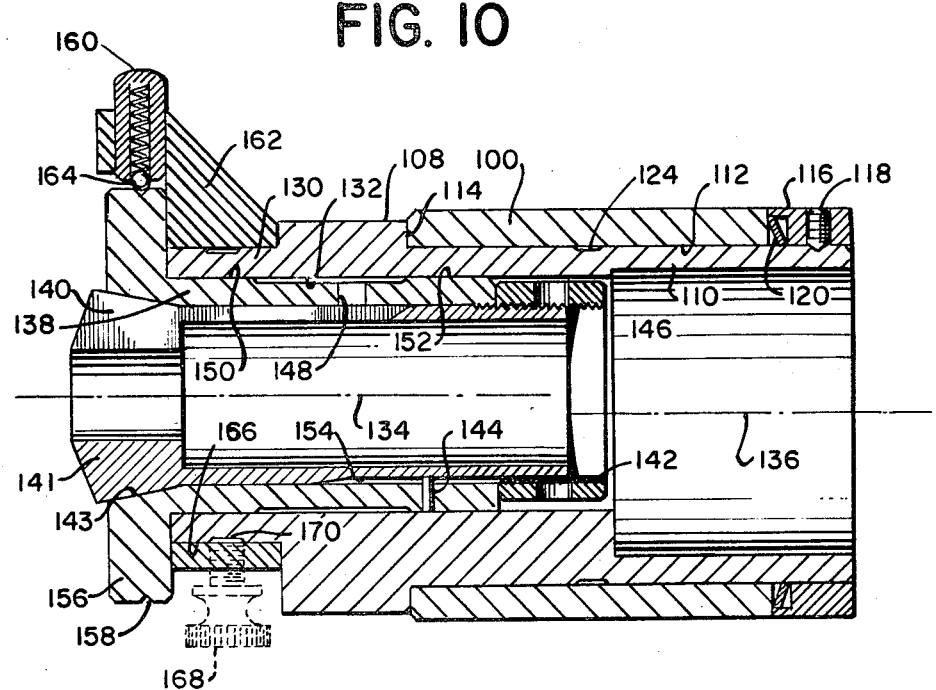
FIG. 10 is a sectioned view of the alternate embodiment taken along the line 10—10 in FIG. 9.

As seen more clearly in FIGS. 9 and 10 the sleeve 108 includes a shoulder 114 which is brought into abutting contact with housing 100 when the fixture is assembled. In this condition, the cylindrical portion 110 extends through the cylindrical bore 112 of housing 100 at the end opposite shoulder 114 and an annular locking ring 116 is secured to the portion 110 by means of set screws 118. In order to allow the sleeve 108 to rotate freely within housing 100 without excessive end play, a spring washer 120 is interposed between the annular ring 116 and the housing 100.

Figure 11:
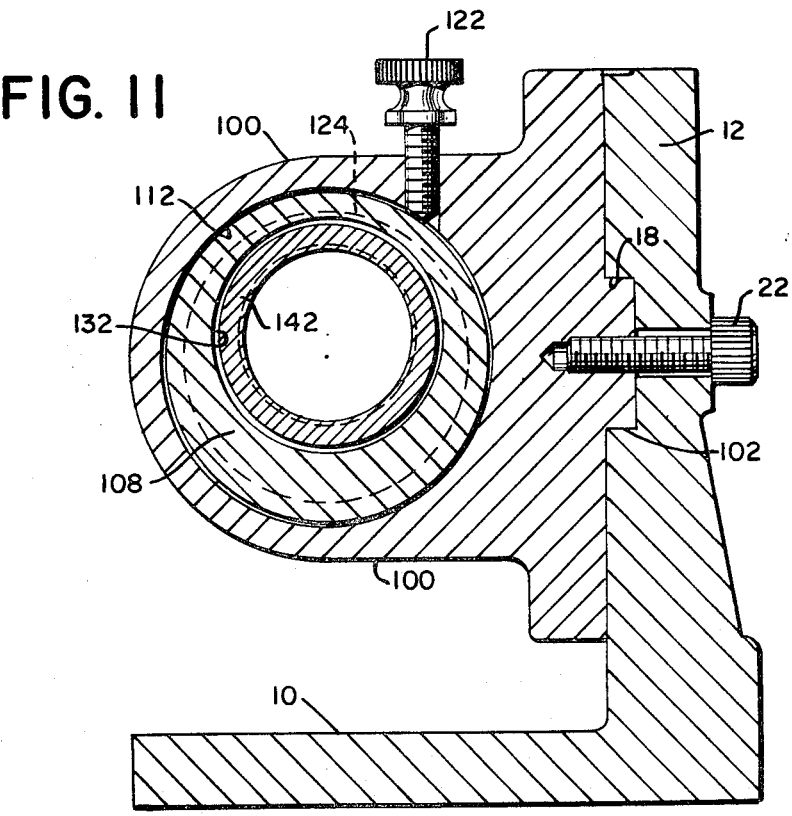
FIG. 11 is a sectional view of the alternate embodiment taken along the line 11—11 in FIG. 9.

FIGS. 7, 9 and 11 indicate that the sleeve 108 can be locked to the housing 100 be means of a thumb screw 122 which extends through the housing 100 into the cylindrical bore 112. The sleeve 108 contains a circumferential slot 124 at an axial position along the cylindrical portion 110 which corresponds with the position of thumb screw 122 in the housing 100. When the sleeve is to be held fixedly within the housing 100, the thumb screw is simply tightened in the slot 124. The slight offset of screw 122 from the central axis of portion 110 aids the friction forces securing the sleeve 108 within the housing 100. While the function of the sleeve 108 normally contemplates rotation, the ability to lock the sleeve 108 permits the fixture to be used for grinding tools such as end mills or other tools that do not require radial relief.

As seen in FIGS. 7 and 10 the sleeve 108 includes a second cylindrical portion 130 at the forward end of the tool fixture. The portion 130 is eccentrically located with respect to the first portion 110, that is portion 130 has a central cylindrical channel 132 with an axis 134 eccentric to the axis 136 of bore 112 (axis 136 is also the axis of portion 110). A rotatable tool holder assembly consisting of a casing 138, collet 140, jam nut 142 and a guide pin 144 is rotatably mounted within the cylindrical channel 132. A tool is mounted within the assembly by insertion in the collet 140 and tightening the jam nut 142 against the casing 138 by means of spanner wrenches which engage the radial holes 146 in the nut 142 and radial hole 148 in the casing 138. The conical jaws 141 on the collet 140 squeeze against the tool inserted within the collet 140 as the jam nut 142 wedges the jaws 141 against the mating conical surface 143 of the casing 138. In order to maintain a preselected orientation of the collet 140 when mounted within the casing 138, a guideway 154 is cut into the collet and is engaged by the guide pin 144 secured within the casing 138. Bearing surfaces 150 and 152 on the casing 138 support the tool coaxially with the eccentric axis 134. As in the first embodiment of my fixture, rotation of sleeve 108 with the tool holding assembly and tool in place will sweep the tool across a grinding wheel in an arc eccentric of the tool center, but it will be noted that eccentric axis 134 is above axis 136 of bore 112, whereas the eccentric axis 36 of the previous embodiment is below the housing axis 26.

The forward end of the casing 138 includes a collar, 156 which abuts the confronting end of cylindrical sleeve portion 130 during the grinding process. The peripheral surface of the collar 156 includes a plurality of detent depressions 158.

A detent mechanism 160 mounted to an adjustable collar 162 on the end of the cylindrical portion 130 cooperates with the depressions 158 to retain the tool holding assembly rotationally as well as axially during the grinding process. The detent mechanism 160 includes the spring loaded ball 164 as in the first embodiment of my invention.

Figure 12:
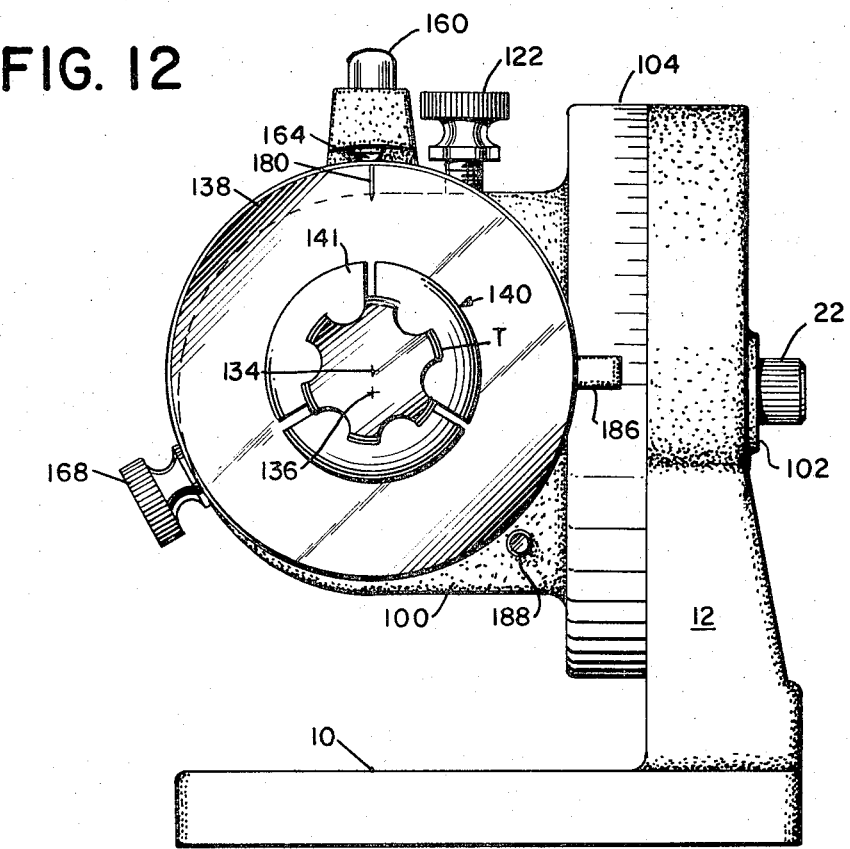
FIG. 12 is an end view of the alternate embodiment showing a right-hand tap T secured in a grinding position.
Figure 13:
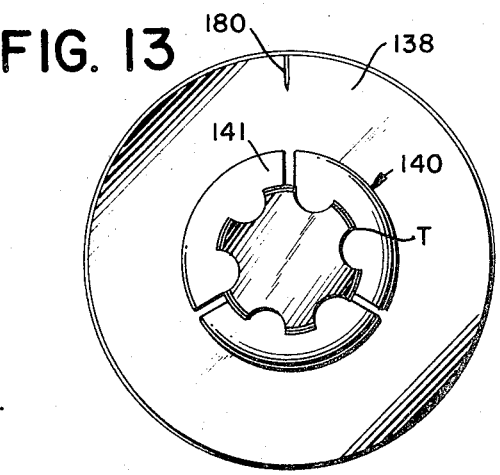
FIG. 13 is an abbreviated end view of the alternate embodiment as shown in FIG. 12 with a left-hand tap T secured in a grinding position.

In contrast to the first embodiment of my invention, the detent mechanism 160 is rotatably adjustable with collar 162 on bearing surfaces 166 at the end of cylindrical portion 130. The bearing surfaces 166 are also coaxial with eccentric axis 134 so that both the collar 162 and the casing 138 can be rotated (together or independently) about the eccentric axis 134. To secure the collar 162 to the sleeve portion 130 a thumb screw 168 is included in the collar 162. The thumb screw 168 engages a circumferential groove 170 to prevent the collar from moving either axially or rotationally on the bearing surfaces 166. Comparison with FIG. 12 shows that thumb screw 168 has been rotated out of position with respect to detent mechanism 160 in FIG. 10 for clarity.

The adjustable, rotatable collar 162 permits the radial relief ground on cutting tools such as taps and twist drills to be varied. Reference to FIGS. 8–13 makes this feature more readily apparent. For purposes of illustration, a tap T is shown in the collet 140 in FIGS. 12 and 13. The radial relief on the cutting surface of the tap varies as a function of the displacement of the central axis of the tap from the line connecting the contact point of the tap on the grinding wheel with the center of rotation of the tap (axis 136) as it is swept across the grinding tool. A slight rotation of the tap within the eccentric sleeve portion 130 will delay the contact of the cutting edge with the grinding wheel until after the eccentric axis 134, and consequently the central axis of the tap, have passed the vertical line between the bore axis 136 and the grinding wheel. In effect, the center of the eccentric arc generated on the flute of the tap and consequently the radial relief on the flute, is varied by rotating the tap within the cylindrical sleeve portion 130.

The precise radial relief can be selected by initially positioning the tap T in a preselected position in the collet 140 and rotating casing 138 a given amount in sleeve portion 130 by means of the collar 162. The offset sleeve portions 110 and 130 may be thought of as a cam which generates the radial relief. As the tap and casing 138 are rotated within the sleeve portion 130 by means of the collar 162, the surfaces to be ground on the tap are referenced to a different working section of the cam and accordingly a different relief on the tool is cut. As shown in FIG. 12 wherein the sleeve portion 130 has been rotated to place the eccentric axis 134 directly above the bore axis 136, the cutting edge of the tap T has been aligned directly with one radial edge of the jaw 141. Since the radial edge is slightly offset from the index mark 180 and from the vertical line between axes 134 and 136 which define the reference on the cam for zero relief, a slight radial relief, for example 0.007 inches per 1/16 inch of sweep at the grinding wheel, will be produced.

As described above, the collet 140 is keyed to the casing 138 so that the orientation of the cutting edge with the edge of jaw 141 will determine a preselected radial relief assuming that the detent mechanism 160 and a recess 158 are also aligned with the vertical line between axes 134 and 136. The index mark 180 on the forward face of casing 138 represents the alignment reference for the cutting edge of tap T with respect to the cam which would produce zero radial relief when aligned in the sleeve portion 130 with both axes 134 and 136. The slight rotation of the tap T in collet 140 to bring the cutting edge in alignment with the radial edge of jaw 141 introduces the initial small amount of relief mentioned above due to the slight offset of the edge with respect to the cam. This initial amount of radial relief can be increased or decreased by rotation of the detent mechanism 160 on collar 162 away from alignment with both axes 134 and 136 or the zero reference on the cam. The zero reference on the cam as seen in FIG. 9 is obtained by a correspondence of the central graduation of scale 182 on the sleeve 108 with the index mark 184 on the rotatable collar 162. A slight rotation of the collar 162 counterclockwise on the cam as seen in FIG. 12 increases the amount of radial relief generated on the upper flute of tap T. The graduations of scale 182 moving in the direction of arrow 181 from minimum ("min." indication) to maximum ("max. r.h." indication) are indicative of larger rake angles at the cutting edge of a right-hand tape. Such rotation is readily accomplished by loosening thumb screw 168, rotating collar 162 to a new position and tightening the thumb screw 168.

It will be noted that the cutting edge shown aligned in FIG. 12 with the jaw 141 indicates that the tap T is a righthand tap and therefore counterclockwise rotation on the cam is required for increased rake. For grinding left-hand taps the opposite edge of the flute would be aligned with the opposite jaw as shown more clearly in FIG. 13. If the desired rake angles on the left-hand taps are greater than those initially established by such alignment, clockwise rotation of collar 162 on the cam is necessary. The graduations of scale 182 moving in the direction of arrow 183 from minimum ("min." indication) to maximum ("max. l.h." indication) are therefore indicative of greater rake angles for left-hand taps.

It will thus be seen that the embodiment of my sharpening fixture shown in FIGS. 7–13 permits the radial relief of various tools to be adjusted. Such adjustment may be called for where tools of different sizes are to be sharpened or where a particular tool requires a greater rake angle. By mounting the detent mechanism 160 on the rotating collar 162, identical radial reliefs will be ground on each flute of the tap T regardless of which flute has been indexed under the detent mechanism 160. As a consequence, the profiles on each flute will be the same.

Except for the added feature of radial relief adjustment permitted by the adjustable collar 162 and the positioning of eccentric axis 134 above housing axis 136, the embodiment of my sharpening fixture in FIGS. 7–13 operates in the same manner as the embodiment disclosed in FIGS. 1–6. After the tool has been mounted in the tool holding assembly and the assembly has been adjusted within the sleeve portion 130 by means of the collar 162, the housing 100 is tilted with respect to the base 10, if necessary, and the tap T is brought in contact with the grinding wheel and swept across the wheel by rotating sleeve 108 within the housing 100. In order to aid the operator during the grinding process, a stop member 186 seen most clearly in FIGS. 7, 8, 9 and 12 is secured to the rotatable collar 162. To start the sweep of the tap across the grinding wheel, the operator initially brings the stop member 186 into contact with the dowel 188 projecting from the housing 100. Since the rotational adjustment of collar 162 causes the stop member 186 to sweep through a number of eccentric paths about the axis 136 depending on the rotational adjustment of collar 162, the member 186 is prolonged radially to insure that the dowel 188 will be engaged at the extreme adjustments of the collar 162 on the sleeve 108.

It should be noted that the aligning and grinding operations are essentially the same regardless of which surface of the tool is to be ground. If the conical cutting surfaces of the tap T or a twist drill are to be ground, the housing 100 must be tilted according to the scale 104 to the appropriate angle with respect to the base 10. If cylindrical cutting surfaces of a tool are to be ground, the housing 100 is held in the horizontal position and the peripheral surfaces of a grinding wheel are contacted, or the housing 100 is tilted upwardly to a vertical position and the face of a grinding wheel may be contacted.

Figure 14:
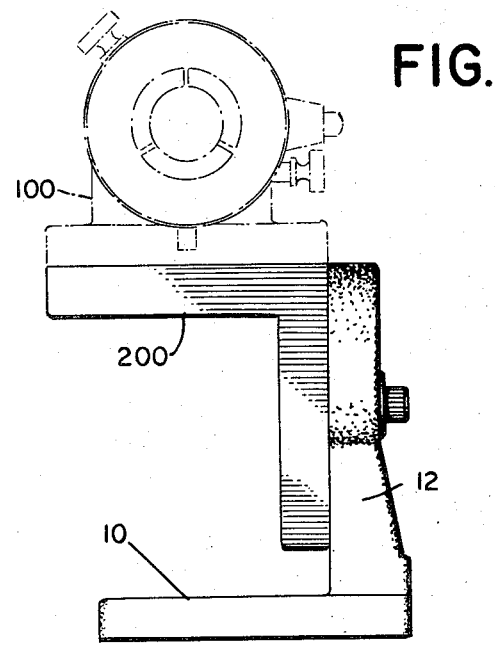
FIG. 14 shows the alternate embodiment supported at an elevated position above the base by means of an adaptive bracket.

FIG. 14 discloses a modified embodiment of the fixture shown in FIGS. 7–13. The individual components are essentially unchanged; however, an additional adaption bracket 200 is interposed between the support element 12 and the housing 100. The adaption bracket 200 permits the tool holding portion of the fixture, basically that within housing 100, to be elevated above the pivot provided by bolt 22. By such relocation of the housing 100, the fixture may more easily accommodate very long drills such as the type employed for boring gun barrels without interference between such long drills and the base 10. It will be understood that without the adaption bracket 200, the mounting of such long drills through the sleeve 108 would leave a significant portion of a drill projecting from the rear of the sleeve adjacent the locking ring 116 so that subsequent tilting of the sleeve 108 and housing 100 on the support 12 might result in interference with the base 10. In contrast, the relocation of the housing 100 places the axis of the tool or drill to be ground at a position more remote from the base 10 and the opportunity for interference is significantly reduced.

From the foregoing description and discussion, it will be seen that the present invention results in a universal tap sharpening tool which is simple to construct, easy to operate, and which provides maximum accuracy, alignment and repeatability in the sharpening operation. While the present invention has been discussed in terms of tap sharpening, it will be understood that it can also be employed in the grinding of drills or any other tool where an accurate radial relief is required.

While preferred embodiments have been shown and described, various modifications and substitutions may be made without departing from the spirit and scope of this invention. Accordingly, it is to be understood that this invention has been described by way of illustration rather than limitation.

What is claimed is:

1. A tool sharpening fixture including:
   a base;
   a housing mounted on said base, said housing including a hollow sleeve housing cylindrical about a first axis, said housing being rotatably mounted with respect to said base whereby the inclination of said first axis with respect to said base may be selectively varied;
   a sleeve rotatably mounted in said sleeve housing, said sleeve being rotatable about said first axis;
   means retaining said sleeve in said sleeve housing;
   a passageway in said sleeve, said passageway having a second axis eccentric with respect to said first axis;
   adjustable control means for limiting the rotation of said sleeve with respect to said sleeve housing, said control means being adjustable to establish at least two different limits of rotation for said sleeve;
   a tool holder releasably mounted in said passageway, said tool holder having an axis coincident with said second axis whereby rotation of said sleeve about said first axis causes an eccentric motion of said tool holder;
   positioning means for retaining said tool holder in said passageway and for aligning said tool holder in successive posiitons in said passageway, said positioning means including a collar on said tool holder, a series of depressions about the periphery of said collar, and detent means mounted on said sleeve housing for engagement with said depressions; and reference means mounted on said tool holder for proper initial location of a tool to be mounted in said tool holder.

2. A tool sharpening fixture as in claim 1 wherein said control means includes:
at least two depressions in said sleeve; and
plunger means selectively positionable to cooperate with a depression to limit the movement of said sleeve.

3. A tool sharpening fixture as in claim 1 wherein:
said detent means includes a spring loaded ball mounted on an extension from said sleeve.

4. A tool sharpening fixture as in claim 1 wherein said reference means includes:
a positioning blade adjustably mounted on said tool holder.

5. A tool sharpening fixture as in claim 4 wherein:
said blade has a surface contoured for engagement with the tool to be sharpened.

6. A tool sharpening fixture as in claim 5 wherein:
said blade is mounted in a groove in said tool holder and is radially adjustable with respect to said second axis.

7. A tool sharpening fixture as in claim 1 wherein said tool holder includes:
set screw retaining means for retaining a tool in said tool holder.

8. A tool sharpening fixture comprising:
a base member;
a housing pivotally mounted to the base member about a tilt axis for tilting the housing with respect to the base member, the housing having a cylindrical bore with a bore axis;
a sleeve having a first cylindrical portion rotatably mounted within the cylindrical bore coaxially with the bore axis for rotation of the sleeve with respect to the housing and tilting with the housing with respect to the base member, the sleeve having a second cylindrical portion having an axis eccentrically located with respect to the first cylindrical portion and the bore axis;
a tool holding assembly supported by the second cylindrical portion of the sleeve rotatably about the eccentric axis and including tool gripping means for securing the tool to the assembly and rotating the tool about the eccentric axis and eccentrically of the bore axis; and
adjustable indexing means rotatably mounted to the second cylindrical portion of the sleeve for rotational adjustment about the eccentric axis and including an indexing lock means operatively engaging the rotatable tool holding assembly to position the tool with respect to the sleeve at a plurality of index positions.

9. The tool sharpening fixture of claim 8 wherein:
a lock means is operatively interposed between the housing and the sleeve to secure the sleeve in the housing at a preselected rotational position.

10. The tool sharpening fixture of claim 8 wherein:
the first cylindrical portion of the sleeve includes a shoulder abutting the housing at one end of the cylindrical bore and a projecting end at the opposite end of the bore;
an annular member is secured in overlapping relationship to the projecting end of the first cylindrical portion; and a resilient element is sandwiched between the housing and the annular member at the opposite end of the bore.

11. The tool sharpening fixture of claim 8 wherein:
the tool holding assembly includes a casing defining a passageway extending parallel to the eccentric axis;
the tool gripping means includes a collet slidable axially within the passageway of the casing and an axially extending guide way; and
a guide pin is secured to the casing and interposed in the guide way of the collet.

12. The tool sharpening fixture of claim 8 wherein:
the tool holding assembly includes a casing defining a central bore extending parallel to the eccentric axis;
a collet extending through the central bore and having a conical shoulder abutting the casing at a tool gripping end and a threaded portion projecting from the bore at the opposite end; and
a jam nut on the threaded portion of the collet.

13. The tool sharpening fixture of claim 8 wherein:
the second cylindrical portion of the sleeve has one end projecting along the eccentric axis away from the first cylindrical portion and defines a coaxial cylindrical channel opening at the projecting end;
the tool holding assembly includes a casing rotatably mounted within the channel, the casing having an expanded section abutting the projecting end of the second cylindrical portion and circumferentially spaced detent depressions on the periphery of the expanded section; and
the adjustable indexing means is mounted on the projecting end of the second cylindrical portion adjacent the expanded section of the casing and the indexing locking means has a detent cooperating with the detent depressions on the expanded section.

14. The tool sharpening fixture of claim 13 wherein:
the projecting end of the second cylindrical sleeve portion has an external cylindrical bearing surface coaxial with the eccentric axis; and
the adjustable indexing means includes a collar supporting the detent and rotatably mounted on the bearing surface and a radially adjustable lock screw carried by the collar for locking the collar at various rotational positions to the second cylindrical sleeve portion.

15. The tool sharpening fixture of claim 14 wherein:
the second cylindrical sleeve portion and the rotatable collar bear cooperating calibrations for establishing a preselected rotational adjustment of the tool holding means with respect to the second sleeve portion.

16. The tool sharpening fixture of claim 14 wherein:
a rotational stop member projects from the rotatable collar; and
a stationary stop member extends from the tiltable housing into the eccentric paths swept by the rotational stop member at a plurality of the various positions of the collar on the second cylindrical sleeve portion.

17. The tool sharpening fixture of claim 8 wherein:
the eccentric axis of said second cylindrical portion of the sleeve is above the axis of the first cylindrical portion of the sleeve with respect to said base member.

* * * * *